US009626879B2

(12) United States Patent
Manci et al.

(10) Patent No.: US 9,626,879 B2
(45) Date of Patent: Apr. 18, 2017

(54) DYNAMIC OPERATOR BEHAVIOR ANALYZER

(71) Applicant: Crown Equipment Corporation, New Bremen, OH (US)

(72) Inventors: Lewis H. Manci, New Bremen, OH (US); Philip W. Swift, Oakwood, OH (US); Lucas B. Waltz, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 239 days.

(21) Appl. No.: 14/478,015

(22) Filed: Sep. 5, 2014

(65) Prior Publication Data
US 2015/0064668 A1 Mar. 5, 2015

Related U.S. Application Data

(60) Provisional application No. 61/874,172, filed on Sep. 5, 2013.

(51) Int. Cl.
G09B 19/16 (2006.01)
G06Q 10/06 (2012.01)
G09B 5/00 (2006.01)

(52) U.S. Cl.
CPC ......... *G09B 19/16* (2013.01); *G06Q 10/0639* (2013.01); *G06Q 10/06398* (2013.01); *G09B 5/00* (2013.01)

(58) Field of Classification Search
CPC ...................................... G09B 19/16
(Continued)

(56) References Cited

U.S. PATENT DOCUMENTS 5,758,299 A 5/1998 Sandborg et al.
6,516,273 B1 2/2003 Pierowicz et al.
(Continued)

FOREIGN PATENT DOCUMENTS

EP 2296124 A1 3/2011
WO 2013004846 A1 1/2013

OTHER PUBLICATIONS

Park, Tae Wook; International Search Report; International Patent Application No. PCT/US2014/054238; May 29, 2015; International Application Division-Korean Intellectual Property Office; Korea.

*Primary Examiner* — Xuan Thai
*Assistant Examiner* — Kristen Shirley
(74) *Attorney, Agent, or Firm* — Stevens & Showalter, LLP

(57) ABSTRACT

Dynamic industrial vehicle monitoring for modification of vehicle operator behavior comprises identifying a metric that characterizes an event associated with the operation of an industrial vehicle, the metric having at least one behavior modification action and at least one performance parameter to evaluate the event against. Monitoring operation of the industrial vehicle is carried out for the event. Upon detecting an occurrence of the event, event data is recorded that characterizes a response of a vehicle operator to the event. The recorded event data is evaluated against at least one performance parameter associated with the corresponding metric to determine whether the vehicle operator demonstrated appropriate behavior for the event. A vehicle operator score is updated based upon the evaluation and the updated vehicle operator score is communicated.

16 Claims, 7 Drawing Sheets

(58) Field of Classification Search
USPC .............................................. 434/29–71, 219
See application file for complete search history.

(56) References Cited

U.S. PATENT DOCUMENTS

| | | |
|---|---|---|
| 6,909,947 B2 | 6/2005 | Douros et al. |
| 7,356,392 B2 | 4/2008 | Hubbard et al. |
| 7,362,239 B2 | 4/2008 | Franczyk et al. |
| 8,140,358 B1 | 3/2012 | Ling et al. |
| 8,248,263 B2 | 8/2012 | Shervey et al. |
| 8,508,353 B2 | 8/2013 | Cook et al. |
| 2003/0222898 A1* | 12/2003 | Macomber ............ G06F 9/4446 715/709 |
| 2005/0131597 A1 | 6/2005 | Raz et al. |
| 2006/0053038 A1 | 3/2006 | Warren et al. |
| 2008/0154691 A1* | 6/2008 | Wellman ............... G05D 1/0282 705/7.26 |
| 2008/0243558 A1 | 10/2008 | Gupte |
| 2008/0319602 A1 | 12/2008 | McClellan et al. |
| 2010/0087984 A1 | 4/2010 | Joseph |
| 2010/0271214 A1 | 10/2010 | Frederick |
| 2011/0279261 A1 | 11/2011 | Gauger et al. |
| 2012/0068860 A1 | 3/2012 | Popovic |
| 2012/0143952 A1* | 6/2012 | von Graf ............... G06Q 50/01 709/204 |
| 2013/0143181 A1 | 6/2013 | Greenberg et al. |
| 2013/0209968 A1 | 8/2013 | Miller et al. |

\* cited by examiner

DYNAMIC OPERATOR BEHAVIOR ANALYZER

CROSS REFERENCE TO RELATED APPLICATIONS

This application claims the benefit of U.S. Provisional Patent Application Ser. No. 61/874,172, filed Sep. 5, 2013, entitled DYNAMIC OPERATOR BEHAVIOR ANALYZER, the disclosure of which is hereby incorporated by reference.

BACKGROUND

The present disclosure relates to electronic systems for collecting vehicle operational data that can be translated into workforce data, used for evaluating workforce behavior, and used for presenting timely and actionable workforce information.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, workers are linked to a management system executing on a corresponding computer enterprise via mobile wireless transceivers. For instance, in order to move items about a facility, workers often utilize industrial vehicles, including for example, forklift trucks, hand and motor driven pallet trucks, etc. The wireless transceivers are used as interfaces to the management system to direct workers in their tasks, e.g., by instructing workers where and/or how to pick, pack, put away, move, stage, process or otherwise manipulate the items within a facility. The wireless transceiver may also be used in conjunction with a suitable input device to scan, sense or otherwise read tags, labels or other identifiers to track the movement of designated items within the facility.

BRIEF SUMMARY

According to aspects of the present disclosure, a method is provided, for dynamic industrial vehicle monitoring for modification of vehicle operator behavior. The method comprises identifying a metric that characterizes an event associated with the operation of the industrial vehicle. By way of example, a metric can include an action attributable to the industrial vehicle itself (e.g., impacts, load capacity, acceleration, braking, etc.). An exemplary metric can also include an action attributable to a vehicle operator (e.g., checklist compliance, proper vehicle dismount, time management, efficiency of operation, performance, etc.). Still further, an exemplary metric can include an action attributable to, or otherwise related to the environment (e.g., speed zone, stop, ramp, restricted area, etc.). The metric has at least one performance parameter to evaluate against the associated event. A performance parameter defines the desired, intended, appropriate or otherwise required vehicle operator behavior (e.g., what the vehicle operator should and/or should not do) in response to an occurrence of the event associated with the metric.

Still further, the method comprises monitoring operation of the industrial vehicle for the event and detecting an occurrence of the event. In response to detecting the event, the method comprises recording event data that characterizes a response of the operator to the event (e.g., by capturing the vehicle operator behavior such as operator action(s) or operator inaction(s), by capturing the industrial vehicle state, by capturing the environmental state, etc.).

By way of example, assume an event such as "operator should sound horn at an end of an aisle" is associated with the metric. The performance parameter for that metric may be data that represents a desired operator action, such as "operator sounded horn." Assume that the vehicle operator reaches the end of an aisle while operating the industrial vehicle, thus triggering an occurrence of the event. In response thereto, the method captures event data indicative of whether the vehicle operator did or did not sound the industrial vehicle horn at an appropriate time.

The method also comprises evaluating the recorded event data against at least one performance parameter to determine whether the vehicle operator demonstrated appropriate behavior for the event. Keeping with the above example, the method can compare event data such as horn activation data extracted off of the vehicle network bus (e.g., CAN bus) to the performance parameter (e.g., data that indicates that the horn should be sounded) to determine whether or not the vehicle operator complied with the intended behavior for the associated event.

The method still further comprises updating a vehicle operator score based upon the evaluation and communicating the updated vehicle operator score.

According to further aspects herein, the method may further comprise identifying at least one behavior modification action associated with the metric. A behavior modification action is an action that educates the vehicle operator as to the necessary behavior to reach a desired outcome in response to an event (e.g., to satisfy or otherwise comply with the corresponding performance parameter(s)). Keeping with the above example, a behavior modification action may be an action to provide a tip (e.g., via a message to the vehicle operator) to sound the horn at the end of the aisle.

In this regard, in an illustrative implementation, monitoring for the event comprises predicting that the event will occur before the event actually occurs and performing the behavior modification action before the event actually occurs. The method may further comprise determining whether the operator has been inculcated to respond to the event and performing the behavior modification action before the event actually occurs based upon the determination that the operator has not been inculcated to respond to the event. As such, the method does not implement the behavior modification action for a vehicle operator that has demonstrated the appropriate behavior in response to the event associated with the metric. Correspondingly, the method does implement the behavior modification action for a vehicle operator that requires instruction, guidance or supervision (e.g., an operator that has not demonstrated the appropriate behavior in response to the event associated with the metric).

According to further aspects herein, the method may further comprise identifying at least one behavior modification action associated with the metric as noted above. In this regard, the method further comprises performing the behavior modification action upon determining that the vehicle operator did not demonstrate appropriate behavior for the event. Thus, the behavior modification is provided in a reactive manner. Keeping with the above example of sounding the vehicle horn, if the vehicle operator reached the end of an aisle and did not sound the horn (e.g., based upon a comparison of event data to at least one performance parameter associated with the metric), the method executes the behavior modification action (e.g., provides a tip via a message to the vehicle operator to "sound horn at the end of an aisle").

Still further, the method may comprise determining whether the operator has been inculcated to respond to the event and performing the behavior modification action upon determining that the vehicle operator did not demonstrate appropriate behavior for the event, where the operator has not been inculcated to respond to the event. Thus, if the vehicle operator demonstrated the incorrect behavior and has not been provided instruction, guidance or supervision on how to respond to the event, then the method will execute the behavior modification action.

DETAILED DESCRIPTION

Figure 1:
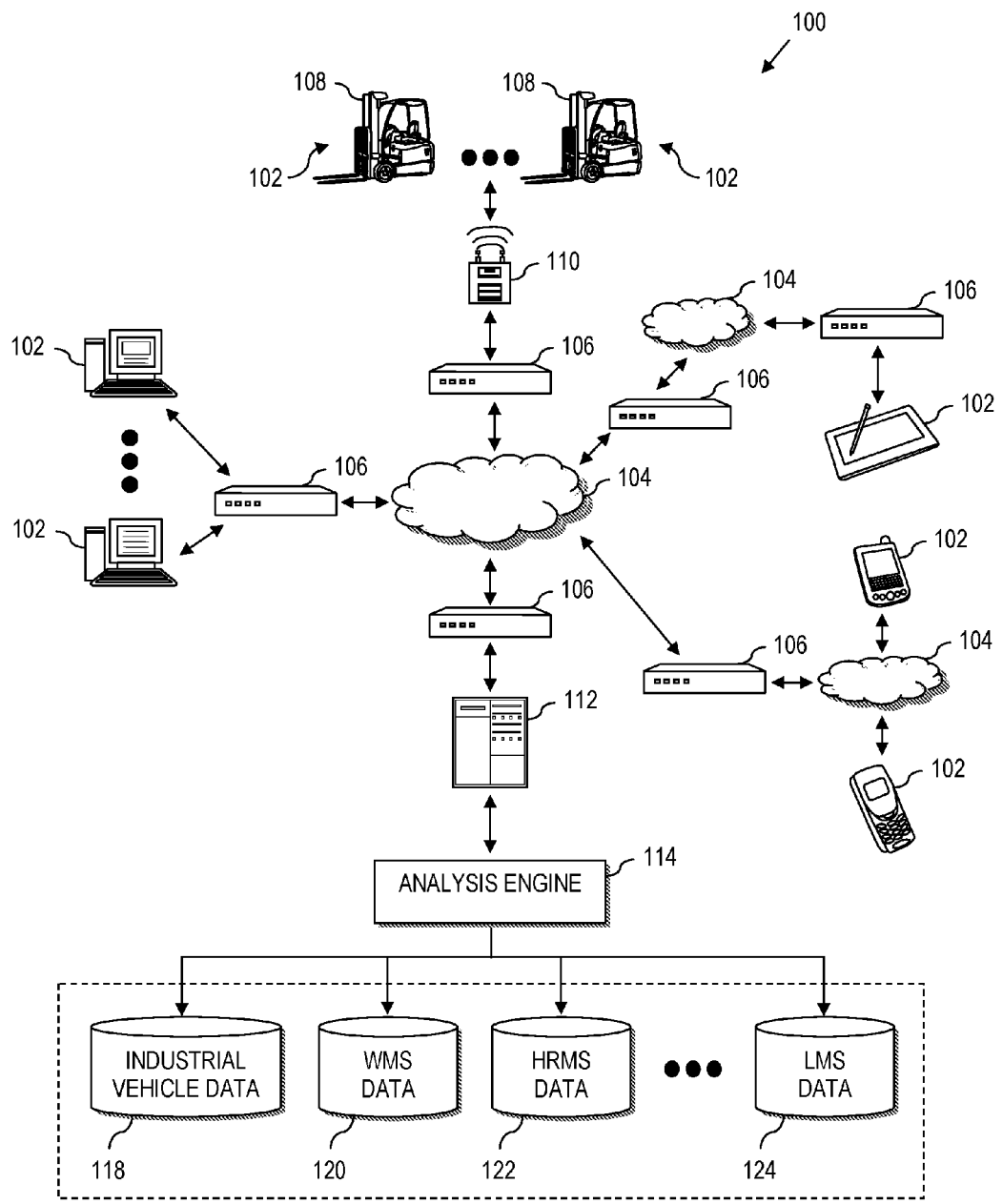
FIG. 1 is a block diagram of a system that includes a dynamic operator behavior analyzer for collecting workforce data, for scoring workforce performance and for presenting workforce information, according to aspects of the disclosure.

According to various aspects of the present disclosure, systems, methods, and computer implemented processes are provided, which collect industrial vehicle information that can be used to derive workforce data, evaluate workforce behavior, and present timely and actionable workforce information. In this regard, aspects of the present disclosure attribute industrial vehicle usage and performance data to a corresponding vehicle operator. The ability to attribute usage and performance data to a vehicle operator facilitates operator inculcating (including persuasive and/or behavioral) by providing timely information to the vehicle operator. As used herein, the term "inculcate" and variants thereof, means to instill or otherwise impress information upon the vehicle operator by instruction or repetition. Thus, an instruction, guidance, supervision, etc., is provided to the vehicle operator as little as once, or as often as necessary through repetition, to establish the appropriate behavior.

In this manner, a processor on the industrial vehicle, server computer, or combination thereof, is utilized to inculcate the vehicle operator, such as through real-time messages on a vehicle display. Alternatively, a vehicle operator can be inculcated by allowing the operator to view collected information (e.g., vehicle operator information, vehicle information, etc.) from one or more time histories (e.g., when the industrial vehicle is stationary). Still further, the vehicle operator can be inculcated through interaction with devices off the industrial vehicle (e.g., by evaluating information on a computer, tablet, smart phone, etc.).

Timely information may be provided prospectively (e.g., by predicting when an action will occur and by providing information, (e.g., instructions, requirements, notices, coaching, etc.)), so that desired outcomes/actions can be addressed before an action is required.

Timely information may alternatively be provided retrospectively (e.g., by looking backwards at data that characterizes an event in which a specific outcome/action was expected). For instance, by detecting that an event occurred and by also detecting that a desired or otherwise expected behavior was not followed, information, (e.g., instructions, requirements, notices, coaching, corrective action, etc.) can be provided to the vehicle operator so that desired outcomes/ actions can be achieved the next time the vehicle operator encounters the event.

Timely information can be provided for as many repetitions as necessary to inculcate an operator. Also, actions may be triggered to automatically re-instigate inculcating (e.g., where an experienced operator fails or is otherwise inconsistent at performing a behavior in response to an event of interest). Accordingly, vehicle operator behavior and accountability are taught, persisted and monitored. This allows the system to ultimately manage exceptions to expected behavior.

Aspects of the present disclosure also provide scoring of operator behavior and the ability to provide feedback to the vehicle operator. For instance, in an illustrative implementation, a vehicle operator score is updated in response to detecting the occurrence of a monitored event. The update to the score is based upon a determination as to whether the vehicle operator behavior complied with expectations associated with the event. Feedback is provided by presenting the score to the vehicle operator. In this regard, gamification can be utilized to present the score, as will be described in greater detail herein. In further exemplary implementations, feedback can also be provided to other entities (e.g., operator team, operator task, facility, warehouse, operation, customer, etc.). Aspects further provide feedback to a supervisor (e.g., via a dashboard with drill-down analytics). In illustrative implementations, the operator score is reflective of operator performance, and can thus be ultimately tied to workforce compensation plans, so that vehicle operators are compensated, at least in part, based upon their score.

System Overview:

Referring now to the drawings and in particular to FIG. 1, a general diagram of a computer system 100 is illustrated according to various aspects of the present disclosure. The computer system 100 comprises a plurality of hardware and/or software processing devices (designated generally by the reference 102) that are linked together by one or more network(s) (designated generally by the reference 104).

The network 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more intranets, extranets, local area networks (LAN), wide area networks (WAN), wireless networks (WiFi), the Internet, including the world wide web, cellular and/or other arrangements for enabling communication between the processing devices 102, in either real time or otherwise (e.g., via time shifting, batch processing, etc.).

The processing devices 102 may comprise transactional systems, purpose-driven appliances, special purpose computing devices and/or other devices capable of communicating over the network 104. In certain contexts and roles, a processing device 102 is intended to be mobile (e.g., a processing device 102 provided on an industrial vehicle 108 such as a forklift truck, reach truck, stock picker, tow tractor, rider pallet truck, walkie-talkie, etc.).

For instance, an exemplary computing device 102 is a mobile asset information linking device (see information linking device 38) as set out in U.S. Pat. No. 8,060,400, the disclosure of which is incorporated by reference in its entirety. In this regard, industrial vehicles include a processing device 102 that communicates wirelessly to the network 104. Under such circumstances, the industrial vehicles 108 can wirelessly communicate through one or more access points 110 to a corresponding networking component 106. Alternatively, the industrial vehicles 108 can be equipped with WiFi, cellular or other suitable technology that allows the processing device 102 on the industrial vehicle 108 to communicate directly with a remote device (e.g., over the networks 104).

In certain illustrative implementations, the processing device 102 also communicates with components of the corresponding industrial vehicle 108 (e.g., via a vehicle network bus (e.g., CAN bus), short range wireless technology (e.g., via Bluetooth or other suitable approach), or other wired connection, examples of which are set out further in U.S. Pat. No. 8,060,400, already incorporated by reference).

Other types of processing devices 102 include for example, personal data assistant (PDA) processors, palm computers, cellular devices including cellular mobile telephones and smart telephones and tablet computers. The processing devices 102 can also comprise netbook computers, notebook computers, personal computers and servers.

The illustrative system 100 also includes a server 112 (e.g., a web server, file server, and/or other processing device) that supports an analysis engine 114 and corresponding data sources (collectively identified as data sources 116). The analysis engine 114 and data sources 116 provide the resources to implement dynamic operator behavior analysis (e.g., to collect workforce data, evaluate workforce behavior, and present timely and actionable workforce information) as described in greater detail herein.

In an exemplary implementation, the data sources 116 are implemented by a collection of databases that store various types of information related to a business operation (e.g., a warehouse, distribution center, retail store, manufacturer, etc.). In the illustrative example, the data sources 116 include databases from multiple, different domains, including an industrial vehicle information database 118, a warehouse management system (WMS) 120, a human resources management system (HRMS) 122, a labor management system (LMS) 124, etc. The above list is not exhaustive and is intended to be illustrative only. Other data, such as from an enterprise resources planning (ERP) database, content management (CM) database, location tracking database, voice recognition, etc., may also and/or alternatively be present. Moreover, data can come from sources that are not directly and/or locally connected to the analysis engine 114. For instance, in certain exemplary implementations, data may be obtained from remote servers (e.g., to access manufacturer databases, etc.).

Traditionally, the data sets that comprise the data sources 116 are utilized in isolation resulting in under-use, missed connection and unnecessary overhead. However, as will be discussed in greater detail herein, the analysis engine 114 can harvest, mine, query, access and otherwise analyze data across the various data sets/databases within the data source 116 to present workforce information in the appropriate context for a number of given roles.

Monitoring and Modification of Vehicle Operator Behavior

According to aspects of the present disclosure, a system referred to as a dynamic operator behavior analyzer implements a method that provides dynamic monitoring and modification of vehicle operator behavior. In general, an industrial vehicle 108 includes a processing device 102 that is configured as a special processor that is programmed to carry out the method or parts thereof, either as a stand-alone, or in part of a system that also includes interaction with a server computer (e.g., the server 112), analysis engine 114 and one or more of the data sources 116. Thus, in illustrative implementations, the dynamic operator behavior analyzer can be implemented on the industrial vehicle solely, or the dynamic operator behavior analyzer can be distributed between the processing device 102 on the industrial vehicle 108 and the analysis engine 114 of the server 112.

In a first characterization, vehicle intelligence is imparted in distinct regards. The processing device 102 is aware of the identity of the particular vehicle operator. For instance, a vehicle operator may be required to provide logon information to operate the vehicle. Also, the processing device 102 is aware of one or more events that can trigger an operator behavior response. An event may be based, at least in part, upon "local awareness," (i.e., events or conditions going on within/on/to the vehicle itself) "environmental awareness," (i.e., events or conditions external to the vehicle) "operator awareness," (i.e., actions of the operator) or combinations thereof. Still further, the method provides different modes of operation including an "inculcating mode" and a "normal mode." The mode can be set for each event associated with an operator behavior, the mode can be set globally, or based upon other parameters (e.g., based upon the type of vehicle that the operator is operating).

In yet another illustrative example, at least three modes may be provided, including an inculcating mode, a normal mode and a warning mode.

As noted in greater detail herein, the inculcating mode is used to establish a desired behavior of the vehicle operator in response to an event of interest. The inculcating mode can be implemented in a manner that is predictive (e.g., by providing a message such as "there is a stop at the intersection ahead"). The inculcating mode may also be implemented in a manner that is reactive (e.g., by providing a message such as "the vehicle failed to sound the horn at the intersection"). Still further, the inculcating mode can be dynamically tailored to the behavior of the vehicle operator (e.g., by providing a coaching message that takes into account the behavior of the operator as compared to the expected behavior). For instance, the inculcating mode may provide a message such as "when carrying a load in excess of 1,000 pounds (454 kilograms), begin braking three seconds earlier to ensure a clean stop at the intersection." Moreover, the inculcating mode can provide affirmations to indicate appropriate behavior. Yet further, the inculcating mode may incorporate aspects that are both predictive and reactive, such as by providing a coaching action before the event occurs and by providing feedback in response to the vehicle operator behavior in response to the occurrence of the event.

Once a vehicle operator is experienced in a desired behavior, the operator can advance to normal mode. The normal mode is used to manage exceptions. That is, the operator is expected to perform the appropriate behavior, so instruction is not provided. Normal mode is used when the system monitors the vehicle operator and determines that the operator is operating the vehicle correctly (and optionally, in a consistent, repetitive manner) according to specified metrics, and thus, is no longer in need of instruction. In normal mode the operator is rewarded for operating the vehicle normally (correctly). For instance, in an illustrative implementation, the system does not present instructive, corrective or other behavior-related messages/actions to the vehicle operator. Such actions are not required, for instance, as the vehicle operator is consistently demonstrating the correct behavior. However, the system may present infrequent positive reinforcement messages like "you have had no impacts for a week." The system may be programmed to set the vehicle operator back to inculcating mode if the vehicle operator exhibits a lapse (or repetitive lapses) in the desired behavior over time.

Warning mode is a mode that may be utilized when the vehicle operator has attained the normal mode, but makes a mistake or lapse in a desired behavior that occurs only infrequently and thus do not warrant changing the vehicle operator back to the inculcating mode. In warning mode, the system provides a corrective action (e.g., tells the vehicle operator immediately after the mistake that the correct behavior was not followed). Warning mode can also remind the vehicle operator of the correct behavior in response to an event of interest.

In further example implementations, other modes may be utilized, depending upon metrics, behaviors and other features to be analyzed.

Example Operation

In operation, the processing device 102 on an industrial vehicle, e.g., a forklift truck, identifies the vehicle operator (e.g., via a suitable operator login). The processing device 102 further monitors for designated events that are tied to operator behaviors to be monitored. Take as an example a predictive action (such as where the industrial vehicle uses location tracking to identify the location and travel of the industrial vehicle within a warehouse). The system (e.g., via the processing device 102 or analysis engine 114 on the server 112) predicts that an event is about to occur, where the event is associated with an operator behavior response. The system checks to see if the particular vehicle operator is inculcated to handle the predicted event.

In an illustrative example, a set of metrics are defined. Each metric is associated with an event that characterizes an event associated with the operation of the industrial vehicle (e.g., where a particular operator behavior is desired). Each metric may have a parameter that is used to store the mode (inculcating, normal, warning, etc.) for that event. Each metric may also have at least one performance parameter to evaluate against the associated event. A performance parameter defines the desired, intended, appropriate or otherwise required vehicle operator behavior (e.g., what the vehicle operator should and/or should not do) in response to an occurrence of the event associated with the metric. Still further, each metric may have at least one behavior modification action. A behavior modification action is an action that educates the vehicle operator as to the necessary behavior to reach a desired outcome in response to an event (e.g., to satisfy or otherwise comply with the corresponding performance parameter(s)).

If the vehicle operator has not been suitably inculcated for the event (i.e., the vehicle operator is associated with an inculcating mode for that event), the processing device 102 on the industrial vehicle implements the behavior modification action (e.g., provides instructions to the vehicle operator). The behavior modification action can be pre-emptive or reactive to the detection of the event, as described more fully herein.

The processing device 102 records a measure of the vehicle operator's performance in responding to the event (e.g., when the event actually occurs) regardless of the mode associated with the metric. The recorded data can be sent to the server for storage and subsequent analysis. Alternatively, the recorded data can be stored and/or analyzed on the industrial vehicle 108. Over time and over one or more repeated encounters with the event, if the vehicle operator demonstrates an ability/behavior to handle the event as defined by the performance parameter(s), then the processing device 102 will convert the vehicle operator over to the normal mode for that event. For instance, a parameter associated with the metric may define the number of consecutive correct behaviors that are required to convert to normal mode for that metric. In normal mode, the behavior modification action is not implemented in response to the event. However, if the vehicle operator fails to behave properly in response to the event, then the system can change the vehicle operator back to inculcating mode for that event.

The vehicle operator behavior in response to the event can also be integrated into a scoring engine that scores the vehicle operator performance. The scoring engine is used to show data to the vehicle operator (and optionally to others) so that the vehicle operator can track their performance.

Scoring

According to aspects of the present disclosure, vehicle operator behavior is scored. In an exemplary approach, the vehicle operator does not accrue a score while the dynamic operator behavior analyzer is operating in inculcating mode. Alternatively, the vehicle operator may accrue a score while the dynamic operator behavior analyzer is operating in inculcating mode. In still a further exemplary implementation, the vehicle operator accrues a score while the dynamic operator behavior analyzer is operating in inculcating mode, but that score is scaled or weighted compared to a similar behavior while the dynamic operator behavior analyzer is operating in normal mode.

During normal mode, the vehicle operator is effectively accumulating points by demonstrating suitable behavior for defined metrics. The operator score continues to improve, for as long as the vehicle operator behavior persists (e.g., without making mistakes of such suitable nature to cause the score to be adversely affected, where the vehicle operator is converted back to an inculcating mode, etc.).

Scores can be based upon a number of different measures. Moreover, a score (or score update) may be tied directly to a corresponding event, or a score may be indirectly tied to one or more metrics. For instance, a score may be a Boolean reward (i.e., you get the full reward or none at all) tied to a specific behavior (e.g., the vehicle operator scores 1 point for each successful stop at an intersection). As an alternative, the vehicle operator score may be adversely affected by failure to demonstrate the expected behavior (e.g., the vehicle operator score is reduced by 1 point for each failure to stop at an intersection). Still further, the vehicle operator may score 1 point for a stop at an intersection, but have 1 point deducted for failure to stop at the intersection at another time. (Here, the reward and deduction need not be the same value).

In other exemplary implementations, a behavior may have a range of points that can be rewarded. For instance, for a putaway, the operator may score 5 out of a possible 10 points for successfully placing a pallet at a rack space 400 inches high. Alternatively, the vehicle operator may score 10 out of a possible 10 points for putting that same pallet away while performing a blending operation of the fork height control with the traction control of the vehicle to optimize energy consumption of the vehicle.

In yet further exemplary implementations, scores can be modified based upon achievements. For instance, the system can evaluate data across a time history and/or across multiple data sources (e.g., the industrial vehicle data 118, the WMS data 120, the HRMS data 122, the LMS data 124, etc.). As a few illustrative examples, a vehicle operator may score points for X consecutive days without taking a sick day, Y consecutive days of timeliness for start/stop/breaks/lunch, etc. Points can be awarded for consecutive days hitting performance benchmarks (personal or warehouse wide), learning new skills, adding new vehicles that the operator is qualified to operate, etc. Points can be awarded for achievements operating the industrial vehicle (e.g., X days without an impact, points for improving efficiency of operation, etc.). Still further, points can be awarded (and optionally deducted) based upon a comparative analysis of a team, workforce, etc. For instance, the top five performers based upon defined criteria can earn bonus points at the end of the month, etc. Moreover, deductions can be established for undesired behavior. An operator may have points subtracted for X consecutive late days, for more than Y impacts over the month, etc.

According to further illustrative aspects of the present disclosure, various metrics carry different score preferences and score characteristics. For instance, a metric such as impact avoidance may have a score characteristic where the best a vehicle operator can accomplish is 100% impact free, corresponding to zero impacts. That is, the maximum is set by an absolute number (zero impacts in this example). Moreover, it is likely that the preference of the enterprise is that each vehicle operator strives for 100% compliance (e.g., zero impacts). In this regard, impacts may be classified as minor and major. The occurrence of a minor impact may adversely affect vehicle operator score in a manner that is different from a major impact. However, the accrual of X minor impacts may increase the deduction to the vehicle operator's score for impacts at a higher value than a single minor impact. Thus, for instance, the impact avoidance metric may have a score preference that enables a vehicle operator to derive a reasonably high score by avoiding major impacts and minimizing minor impacts.

Correspondingly, certain metrics, such as those related to performance, have an artificial number that calibrates to 100%. In this manner, a vehicle operator may, in certain conditions, be able to exceed the maximum, i.e., exceed 100%. For example, a metric that measures putaways, can require X total putaways per shift to correspond to a 100% score. A vehicle operator that completes X+n putaways could achieve a score above 100%. Correspondingly, a vehicle operator that completes X−m total putaways will achieve a score less than 100%.

According to further aspects herein, when the various scores for the defined metrics are aggregated, different metrics can be weighted or scaled to account for the importance of specific metrics to a given implementation. Thus, assume for example, vehicle operator A scores an 80% in impact avoidance and a 105% in putaways. Vehicle operator B scores 87% in impact avoidance and 90% in putaways. Here, due to weighting in the importance of impact avoidance, it is possible that vehicle operator B ultimately ends up with a higher overall score due to the system applying a weighting that favors impact avoidance compared to putaways.

According to aspects of the present disclosure, a mode (e.g., inculcate, normal, warning) is associated with a vehicle operator for one or more metrics. Thus, the same mode may be assigned for all metrics, a subset of metrics, etc. Alternatively, each metric may have its own unique mode associated therewith. Moreover, each metric for each operator may have a unique algorithm with a unique set of parameters, rules, conditions, etc., as described more fully herein.

Moreover, every metric may have a score. Scores can be on any desired scale. In an illustrative example, a score is on a basis of 1-5, where 1 is a beginning operator and 5 is a master operator. The score assessed for each metric can be aggregated into an overall score for a group of metrics, e.g., all safety metrics, all productivity metrics, all energy metrics, etc. The scores for each of the groups of metrics can be aggregated into an overall score for the operator. Moreover, processing such as normalization across the metrics may be performed. A widget on the industrial vehicle may be utilized to display the score or score breakdown to the operator.

The approach herein provide the vehicle operator with the ability to obtain credit for correct behavior on a per/metric basis, for those correct behaviors that are demonstrated between incorrect behaviors (e.g., events for which an incorrect operator response was detected). For instance, the frequency, duration, or combination thereof, of incorrect behaviors can be used to determine whether the dynamic operator behavior analyzer is operating in the normal mode, inculcating mode, or warning mode. Such frequency, duration, or combination thereof, can also be utilized to effect an operator score. For instance, one sever impact associated with an impact metric may be enough to move the dynamic operator behavior analyzer operating mode from normal to inculcating, for a given operator. However, several moving dismounts may be tolerated over a certain duration of time before the dynamic operator behavior analyzer changes the operating mode from normal to inculcating, for a given operator for a moving dismount metric.

Method for Monitoring and Modification of Vehicle Operator Behavior

According to aspects of the present disclosure, methods provide dynamic monitoring and modification of vehicle operator behavior. The methods may be implemented using the system of FIG. 1 (e.g., by executing on a processing device 102 on an industrial vehicle 108, alone, or in cooperation with a server (e.g., the analysis engine 114) executing on the server 112).

Pre-emptive Example

Referring to FIG. 2, a method 200 provides dynamic monitoring and modification of vehicle operator behavior. The method 200 comprises identifying, at 202, a metric that characterizes an action associated with use of an industrial vehicle. As noted in greater detail herein, metrics can include actions attributable to an industrial vehicle itself (e.g., impacts, load capacity, acceleration, braking, etc.). Metrics can also include actions attributable to the vehicle operator (e.g., checklist compliance, proper vehicle dismount, time management, efficiency of operation, etc.). Still further, exemplary metrics can include actions attributable to the environment (e.g., speed zones, stops, ramps, restricted areas, etc.).

For sake of brief illustration, an exemplary metric characterizes an action such as a requirement to sound a horn at an intersection or at an end of an aisle. Another exemplary metric characterizes an action such as a requirement to stop at an intersection or an end of an aisle. Such actions may be mandated by OSHA or an employer. Another exemplary metric characterizes an action such as a requirement to reduce speed when entering a designated "slow zone" such as an area of congestion (e.g., a loading dock area, a shipping lane, etc.).

The identified metric is programmed, configured or otherwise assigned values that enable the performance of the method 200 by the processing device on the industrial vehicle or by the processing device on the industrial vehicle as assisted by a server computer (e.g., the analysis engine 114 as illustrated in FIG. 1). The configuration of values for the metrics is logically organized into categories. By way of illustration, the identified exemplary metric includes at least one behavior modification action and at least one performance parameter, analogously to that described more fully herein. The performance parameter(s) are evaluated against the event associated with the corresponding metric. Assume that an example metric is related to an event to sound a horn at an end of an aisle. An example of a performance parameter for the identified metric is a parameter (e.g., a flag, value or other data that indicates that the horn should sound). For instance, if horn activation data can be extracted from the vehicle CAN bus (or other vehicle network), then the performance parameter may be a value corresponding to "horn activation evaluates to TRUE."

An identified metric may include other categories, examples of which are discussed in greater detail below with regard to FIG. 5.

As used herein, a behavior modification action can include a coaching action (e.g., a teaching/instructing message, event, action, etc.) that is aimed at educating or otherwise informing the vehicle operator as to an expected behavior associated with an event. A behavior modification action may also include a correction action (e.g., a message, warning, event, action, etc.) that is aimed at providing information on what a vehicle operator did, or did not do properly. A behavior modification action may also include a gamification action (e.g., the earning of a badge, a status, an achievement, etc.) based upon the demonstrated behavior or repeated behavior of the vehicle operator.

Assume again, that the example metric is sounding a horn at an end of an aisle. An exemplary behavior modification action includes a message that is displayed on a viewable screen of the industrial vehicle that instructs the vehicle operator to sound the horn at the end of the aisle. The behavior modification action may also include setting a buzzer, alarm, shutting the vehicle down (partially or completely), reducing the performance envelope of the vehicle (e.g., by reducing the maximum allowable travel speed, lift lower speed, etc.) or taking other action.

The method 200 also includes obtaining, at 204, an operator identification that identifies an operator that has logged onto the industrial vehicle. This allows the processing device on the industrial vehicle to apply operator-specific metrics and scoring, as will be described in greater detail herein.

The method 200 further includes monitoring, at 206, for the event. In this regard, the processing device 102 may monitor the corresponding industrial vehicle, the behavior of the vehicle operator, the environment that the vehicle is operating in, external variables (e.g., time/day/date), data values based upon the stored industrial vehicle data 118, data derived from the WMS 120, HRMS 122, LMS 124 (FIG. 1), other data sources, or combinations thereof. In general, the particular event will dictate the requirements for monitoring at 206.

The method 200 also includes predicting, at 208, that the event will occur before the event actually occurs. Keeping with the above example of sounding a horn at an end of aisle, a warehouse may include end of aisle sensors (e.g., radio frequency identification (RFID) chips embedded into the racks or floor). The processing device on the industrial vehicle can receive a signal from an RFID reader that detects the end of aisle RFID chip thus indicating that the end of an aisle is near. Alternatively, if the industrial vehicle is equipped with location tracking, the position of the industrial vehicle within the warehouse may be known. As such, the method can predict that the vehicle is about to approach an end of an aisle based upon location tracking data, which may be determined locally on the industrial vehicle or may be determined at a server (e.g., the server 112). In the case where the server identifies the position of the vehicle, the server can send a message to the industrial vehicle indicating that an end of aisle is near. Still further, the processing device on the industrial vehicle may be capable of odometry. Yet further, different location technologies can be combined to improve accuracy of the prediction.

The method 200 further includes performing, at 210, a determination as to whether the vehicle operator has been inculcated to respond to the event, based upon predicting that the action will occur. If a determination is made that the vehicle operator is not inculcated to respond to the event, the method 200 also comprises performing, at 212, the behavior modification action before the event actually occurs. As such, the method 200 provides timely instruction to the vehicle operator. For instance, if the method 200 predicts that the industrial vehicle is about to approach the end of an aisle and if the method 200 has determined that the vehicle operator is not inculcated for an end of aisle event, then the processing device implements the behavior modification action. This action may include, for instance, presenting an instruction/coaching message on a display screen of the industrial vehicle instructing the vehicle operator to sound the horn before proceeding past the end of the aisle, automatically slowing the vehicle down, taking other actions or combinations thereof.

The method 200 still further comprises detecting, at 214, the occurrence of the event, such as by using event detection logic. In response to detecting the event, the method 200 comprises recording, at 216, event data that characterizes the response of the vehicle operator to the event. The method may also comprise communicating, at 218, relevant information. For instance, the method may update a vehicle operator score based upon the evaluation and communicate the updated vehicle operator score (e.g., to the operator, to the server for storage, etc.). The method may also communicate event data or other relevant information (e.g., to a server computer, to a vehicle operator on the vehicle, to a remote device, etc.). In this regard, the event data that was recorded in response to the event, can be used to adjust the operator score according to the exhibited behavior as noted in greater detail herein.

For example, when the method 200 determines that the industrial vehicle is at the end of the aisle (the event characterized by a corresponding metric), the processing device can be utilized to determine whether the vehicle operator properly sounded the horn before advancing past the end of the aisle, e.g., by comparing captured event data to performance parameter(s) associated with the metric. In this example, the comparison of event data to the performance parameter(s) associated with the metric provides an indication that the vehicle operator did, or did not, appropriately sound the horn at the end of the aisle. Based upon that comparison, a behavior modification event can be triggered (e.g., instructions to correct the deficient behavior, positive affirmation, etc.). As such, aspects of the present disclosure provide the timely feedback, instruction, and behavior analytics. Also, the operator score is updated depending upon the outcome of the comparison of event data to the performance parameter(s) associated with the metric. The score can also trigger other gamification actions, as described more fully herein.

Post-Action Reinforcement:

It is not always possible to predict when an event will occur or to be able to predict when an event will occur with sufficient time to be proactive and preventative. However, according to certain aspects of the present disclosure, the system can include an "active monitor" feature to react to vehicle operator behavior and for scoring operator performance.

Figure 2A:
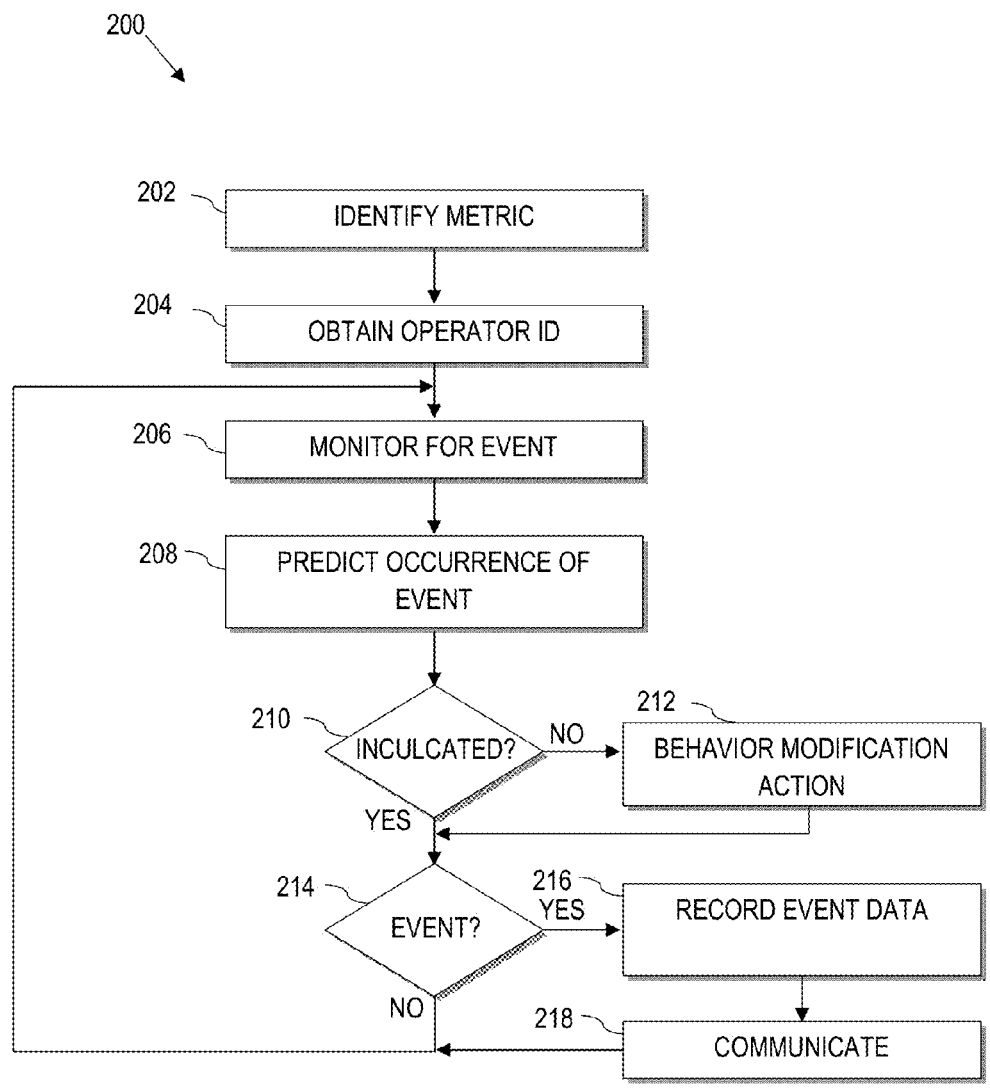
FIG. 2A is a flow chart of a method for providing dynamic monitoring and modification of vehicle operator behavior, according to various aspects of the present disclosure.
Figure 2B:
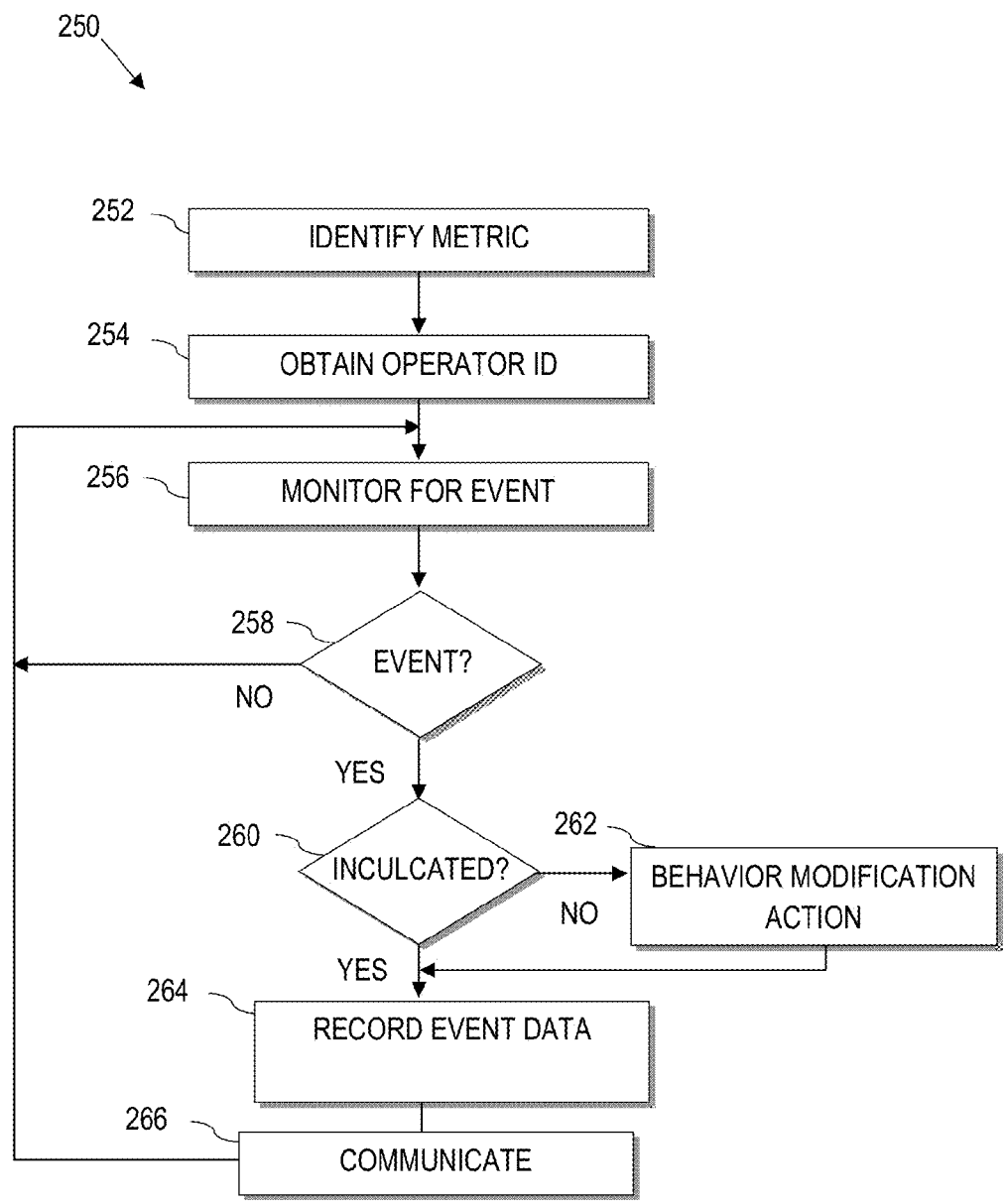
FIG. 2B is a flow chart of a method for providing dynamic monitoring and modification of vehicle operator behavior, according to various aspects of the present disclosure.

Referring to FIG. 2B, a method 250 comprises identifying at least one metric at 252. The metric(s) are identified in an analogous manner to step 202 of FIG. 2A. The method 250 also comprises obtaining an identification of the vehicle operator at 254 (e.g., in a manner analogous to step 204 of FIG. 2A). The method 250 also comprises monitoring for an event (or events) at 256. If an event is not detected by the event decision logic at 258, the method 250 loops back and monitors for event(s) at 256. If an event is detected by the event detection logic at 258, then a decision is made at 260 as to whether the operator is inculcated at the detected event. If the vehicle operator is not inculcated at the event, then a behavior modification action is performed at 262. The behavior modification action is analogous to the behavior modification action at 212 in FIG. 2A, and as described in greater detail herein.

The method 250 then records the vehicle event data at 264. For instance, this may include recording data indicative of whether the operator responded to the event with the correct behavior. The method 250 also comprises communicating at 266, relevant information. For instance, the method may update a vehicle operator score based upon the evaluation and communicate the updated vehicle operator score (e.g., to the operator, to the server for storage, etc.). The method may also communicate event information (e.g., to a server computer, to a vehicle operator on the vehicle, to a remote device, etc.). The event data that was recorded in response to the event is compared to the performance parameter(s) to adjust the operator score according to the exhibited behavior, as set out in greater detail herein.

Referring to the FIGURES generally, in terms of scoring, certain actions can be regarded as Boolean (e.g., true/false, yes/no, etc.): either the operator did, or did not, sound the horn. In a more complex implementation, there may be measurable parameters associated with the event (e.g., the vehicle must slow to a stop, sound the horn, and then advance). If the operator sounds the horn and slows significantly but did not come to a stop then the result may be compared to a threshold that determines if the action was completed "close enough." Alternatively, the score can be adjusted by the "degree" of compliance.

Still further, the operator can be scored based upon performance. The system supports scores for individual metrics, as well as aggregated scores across one or more metrics. Thus, each opportunity to encounter a metric could yield an opportunity to increase (and optionally decrease) the vehicle operator score.

Still further, the vehicle operator score can be assessed against a threshold to determine absolute performance (true measure of vehicle operator compliance) or relative performance (vehicle operator compliance as compared to a benchmark). For example, in an illustrative implementation, an operator's manager may use arbitrary data, past data from the operator, data from the enterprise, "industry data" accumulated from one or more warehouses (internal and/or external to the enterprise), team data collected across a group of operators, etc., which the manager can use as a reference to set target performance for each metric or to set each metric's target automatically. This provides a dynamic environment in which a manager can provide the tools to effectively evaluate operator performance and behavior in an automated manner. Moreover, this provides a manager with an ability to distribute information to vehicle operators within an enterprise to know not only their performance, but also the expectations placed upon the vehicle operator.

For instance, knowing that Z total putaways is required to achieve a 100% score presents a clear and unambiguous indication of vehicle operator expectation. As another example, since a metric such as impact avoidance may be absolute, the vehicle operator knows that 0 sever impacts are expected/required to earn 100% score for impacts. As such, the vehicle operator, by knowing their own score, knows how well they are performing, what behaviors need adjustment, and what expectations are placed upon them to complete their job to satisfactory expectations.

According to further aspects of the present disclosure, the method may also take post event actions. For instance, positive reinforcement may be provided at the time of event. As another example, the method may show the operator where a mistake was as they make it, such as where the operator fails to perform the desired behavior. In this regard, the behavior modification action may be preemptive, reactive or both.

Further aspects of the present disclosure provide an analysis engine capable of trend analysis and the dynamic integration of trending performance to operator feedback. Thus, for example, the methods 200, 250 may further be configured to define whether the vehicle operator is inculcated based upon the vehicle operator successfully complying with the behavior modification action associated with a corresponding event. Thus, assume that the vehicle operator successfully sounds the vehicle horn at the end of an aisle five times in a row. Under such a situation, the method 200, 250 may consider the vehicle operator successfully inculcated. The vehicle operator is converted to a normal mode for that metric. As such, when the method detects the occurrence of the event (e.g., end of aisle), the method 200, 250 will not present the behavior modification action (e.g., an instruction message will not be displayed to the user).

According to still further aspects of the present disclosure, trend analysis can also be used to regress an otherwise inculcated vehicle operator back to an "inculcated" status. For instance, assume that an experienced vehicle operator fails to sound the horn at the end of the aisle (or trend analysis indicates a repeated behavior of not sounding the horn at the end of the aisle). Because the method monitors and records data indicative of operator behavior, the method 200, 250 knows that the vehicle operator is not meeting behavioral requirements/expectations. As such, the vehicle operator is reverted back to inculcating mode for that metric. The vehicle operator must then demonstrate through repeated proper behavior (sound the horn at the end of the aisle in this example) to return to normal mode.

The above simplified example illustrates a single metric. In practice, there is likely to be a plurality of metrics. Moreover, not every metric is likely to be relevant to every operator, vehicle, vehicle type, etc.

Still further, there is likely to be certain metrics that are more important to a supervisor than others. As such, the method 200, 250 may also include identifying a plurality of additional metrics that each characterize an action that is implemented on an industrial vehicle and selecting at least one of a priority and a weighting of the metrics. The weighting or priority will allow a supervisor to tailor the importance of each metric to a given application.

By way of illustration, and not by way of limitation, a software provider can provide a set of metrics that are predefined. A supervisor for a given implementation can select from the list of available metrics that have been predefined. The supervisor can then assign particular values or otherwise modify the metrics to tailor the selected metrics to monitor, modify and track the behavior of the corresponding vehicle operators.

Accordingly, the attribution of usage data and performance data is leveraged to build relationships between a vehicle operator and a corresponding industrial vehicle. The operator sees not only real-time coaching messages and warning messages but can also drill down and see their personal detailed information (e.g., when the industrial vehicle is stationary). According to certain implementations, the operator may have access to the same information that management would see; maps, charts, data, etc. This allows the operator to gain insights about their opportunities to improve in their work skills. Also, where a business monetizes and incentivizes behavioral performance, a high score allows an operator to potentially ultimately make more money.

Moreover, the metrics, scores, and gamification as described above may be calculated without any indication of operator identification. For example, when an operator starts a shift (or some other period of time), the metrics and scores may be kept without the operator having to log onto the vehicle. At the end of the shift, the operator would get feedback and a score about the operator's performance during that shift. Further, the score may remain until the operator clears the score or may be cleared automatically (e.g., at the end of the shift).

Usage and Performance Data

Figure 3:
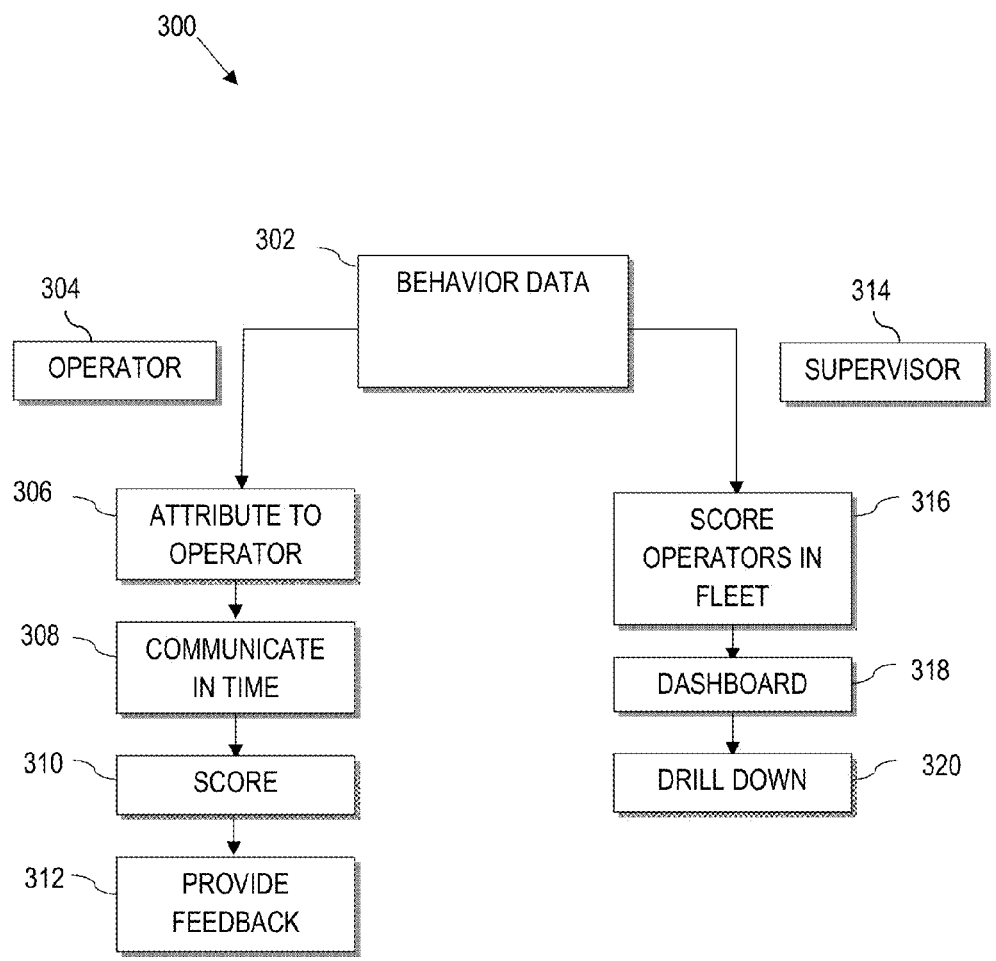
FIG. 3 is a block diagram of exemplary operator-centric and supervisor-centric features of a dynamic operator behavior analyzer, according to various aspects of the present disclosure.

Referring to FIG. 3, a block diagram 300 illustrates aspects of a dynamic operator behavior analyzer for collecting workforce data, for scoring workforce performance and for presenting workforce information according to still further aspects of the present disclosure. The dynamic operator behavior analyzer manipulates operator behavior data 302 (e.g., data that is collected in the method of FIG. 2A and/or FIG. 2B). The behavior data can be used to provide operator-centric features 304. For instance, the collected behavior data 302 can be attributed to the operator at 306. This allows a measure of the vehicle operator in the compliance of operations, and can further serve as a measure of performance. Moreover, the attribution at 306 allows the self-improvement of the vehicle operator without the requirement of taking time away from supervisors, manager, more experienced vehicle operators, to provide instruction to the vehicle operator. For instance, (as noted in greater detail with reference to FIGS. 2A, 2B), methods can provide communication on demand and in time to provide critical instructions (before and/or after an event occurs) that require a particular behavior at 308. This allows the vehicle operator to practice live proper technique and at a timing that presents relevant, actionable information in time to act upon it. This also removes the burden of lost time for other workers in providing the necessary instruction to the vehicle operator.

Also, the behavior data 302 can be aggregated, manipulated, filtered, parsed or otherwise processed to compute a vehicle operator score. This score can be made available to the vehicle operator so that the operator is aware of whether performance over a period of time measures up to workforce expectations. Still further, the operator usage and performance data 302 can be used to provide feedback to the vehicle operator based upon behavior. For instance, as noted above, by transitioning to normal mode for a given metric, a feedback is provided to the vehicle operator. Alternatively, if the vehicle operator is reclassified back to inculcated mode, for a metric, then feedback is provided that a behavioral modification is required. Still further, the system may provide affirmations, statistics and other feedback in addition to instructions.

The operator usage and performance data 302 can also be used to provide supervisor-centric features at 314. For instance, vehicle operator scores can be reviewed by a supervisor at 316. Here, the supervisor can view scores for individual operators, groups of operators, etc. (as compared to the score at 310 which may limit an operator to seeing only the score assessed to them). Moreover, based upon the scores, the supervisor may elect to give feedback (positive or negative) to operators, share results from select operators, etc.

Also, the operator behavior data 302 can be integrated into a dashboard, which allows (near) real-time evaluation of vehicle operator performance (e.g., as measured against a threshold, etc.). In this regard, a supervisor can arrange the dashboard into a hierarchical view that allows only summary data to be shown on the dashboard. For instance, the supervisor may only see an aggregate measure of the scores across a fleet of operators compared to a threshold. The supervisor can then drill down at 320 into the details to see individual data where desired.

Figure 4:
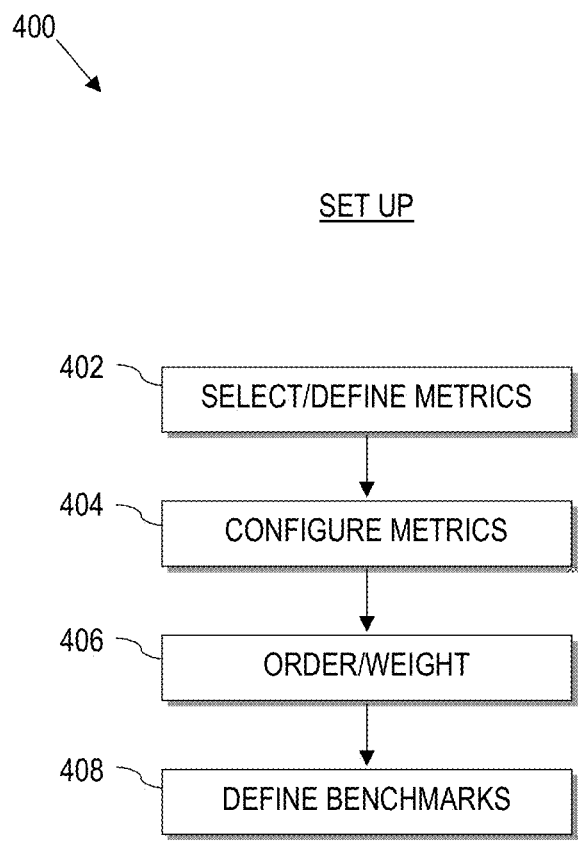
FIG. 4 is a flow chart of an exemplary method of performing a setup for a dynamic operator behavior analyzer, according to various aspects of the present disclosure.

Referring to FIG. 4, according to illustrative aspects of the present disclosure, a supervisor can perform a setup 400 of the dynamic operator behavior analyzer system, (e.g., that implements the method of FIG. 2A, FIG. 2B, the features of FIG. 3, etc.). In this regard, the supervisor selects or otherwise defines metrics at 402. For instance, a supervisor may select from available, predefined metrics, such as by choosing from a menu or other suitable interface. Alternatively, the supervisor may create or otherwise design metrics to suit a particular application.

Selection of metrics may be tailored to impart improvements in warehouse operations (e.g., through limiting impacts, maintaining industrial vehicle stability, adherence to speed limits and stop signs, regular communication and following 'right of way' practices, proper load weights and lift heights, etc.) and through the communication of these behaviors warehouse wide.

By way of example, and not by way of limitation, example metrics may include:

Vehicle Network Bus (e.g., CAN Bus) Facilitated Metrics:

Metrics may include features that can be discerned by queries across a vehicle network bus, e.g., to determine acceleration such as sudden, abrupt starts; activations such as a correct frequency of button activations (e.g., "Assist" features during a task); or battery characteristics, such as whether the battery is underweight, the battery change duration, or whether battery queue instructions are followed. Other such metrics may include blending such as lifting and traveling simultaneously; braking; battery charging or changing, etc. Still further, such metrics may include clock management; checklist compliance; whether the operator performs high speed cornering; whether the operator dismounts the vehicle before the vehicle stops, etc. Yet other metrics may include impacts (collision severity, frequency, etc.); load on the forks relative to vehicle capacity; stability and other features that can be discerned by a query across the vehicle network bus.

Location Tracking Facilitated Metrics:

Yet further metrics can be derived from location based tracking capabilities provided on the industrial vehicle, server, operating environment, or combinations thereof. Examples of such metrics may include the frequency of following system instructions when using semi-automation features; direction of travel, use of a horn, lights, etc., in specific areas, and energy usage vs. cases/pallets moved vs. driving habits. Yet other metrics may include vehicle speed when passing another truck closely in a narrow aisle; whether an industrial vehicle enters a restricted area, obeys speed zones, performs necessary stops, yields, etc.

Performance Metrics

As still further examples, performance metrics may track efficiency, such as whether there is excessive travel or lift outside of an ideal path; whether the operator performs incorrect picks or putaways, etc.

The supervisor then configures the metrics at 404. The configuration at 404 assigns particular values to the metrics so that the processor has meaningful data to analyze. For instance, if a metric is to sound a horn at the end of an aisle, the event needs to be converted into data that can be understood by an automated process. Thus, the "end of aisle metric" may be configured to use location tracking to identify proximity of the industrial vehicle to an end of an aisle. Also, the process may be programmed to read information off of the industrial vehicle CAN bus (or other local vehicle network) so that the system can ascertain whether the operator did, in fact, engage the horn at the proper time. Thus, configuring the metrics comprises setting all necessary parameters, values, rules, etc., which are associated with metrics as described more fully herein.

The supervisor can choose to apply an order/weight at 406 to the selected metrics. For instance, it is likely that certain events will carry a higher importance to the operation of a fleet for certain customers, but not for all customers. As such, the supervisor can customize and scale various metrics to reflect the sensibilities and requirements of the business, local, state or federal laws, etc. Moreover, the metrics can be aggregated up various hierarchical levels (e.g., up to a single, top level score). This score can be used to evaluate vehicle operators and may even serve as a measure of compensation or reward. Still further, the supervisor can define benchmarks at 408. As used herein, the term "benchmark" means some measure that allows a comparison of operator behavior to some standard. The benchmark can be adjusted (e.g., to account for different shifts, locations, or other criteria).

Figure 5:
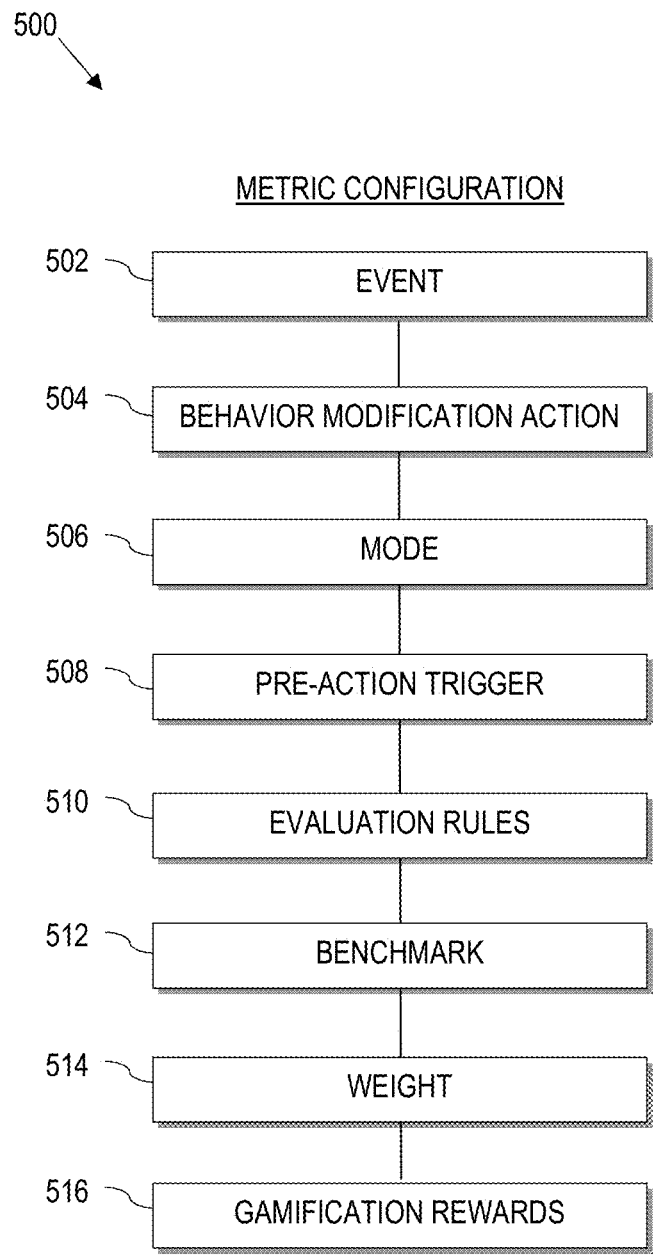
FIG. 5 is a block diagram of classes of variables used to define metrics, according to various aspects of the present disclosure.

Referring to FIG. 5, as noted in greater detail herein, each metric may have various categories of data values associated therewith. An exemplary set of categories 500 is illustrated for sake of example. Example categories include an event description at 502, behavior modification action at 504, mode rules at 506, pre-action trigger(s) at 508, evaluation rule(s) at 510, a benchmark at 512, and a weight at 514.

The event at 502 defines the event associated with the corresponding metric. The event is defined for instance, for situations in which a specific operator behavior is desired.

The behavior modification action at 504 is an action that is carried out when a determination is made that information/coaching is required for a specific operator behavior. For instance, as noted above, a behavior modification action can be an action that educates the vehicle operator as to the necessary behavior to reach a desired outcome in response to an event (e.g., to satisfy or otherwise comply with the corresponding performance parameter(s)). A behavior modification action can be a visual message, an audible message, an alarm, instructional video, a haptic response, a light, a picture/image or other visual metaphor that conveys an instruction, an automated control or adjustment in the performance of the industrial vehicle, such as slowing down the vehicle, limiting controls on the vehicle, etc.

By way of example, communication may be implemented by a head mounted, voice activated display and user experience/user interface, an alternate reality (AR) device such as an AR device built into safety glasses that display information in the operator's peripheral field of view, wearable technology that provides haptic or audio feedback, gloves, reflector vest, etc. Still further, a wristband arrangement can be provided that vibrates in certain conditions to communicate to the operator. Here, the coaching may be provided in such a way without distracting the operator from driving the vehicle.

Another example communication technique may utilize a mobile application that allows the operator to study their opportunities for improvement in a relaxed setting, even off-vehicle/off-site (e.g., at home). The system may also support a blog, online operator community, a game that operators manage on their BLOG without management's intervention, etc.

Examples of Messages on an Industrial Vehicle for the Operator

Impacts
Impact warning messages displayed on an industrial vehicle display may include:
Red, whole screen
  a. "IMPACT 6.2 g Are you OK?"+score card & trend
    i. Buttons for "Yes" or "No"
    ii. If yes then menu for "Play Video?"
    iii. If no then menu for type of impact
Caution Message
  b. Yellow, half screen
    i. "IMPACT 2.2 g"+score card & trend
    ii. Menu for type of impact
    iii.
Positive Reinforcement Messages
  c. Green, whole screen
    i. "IMPACTS Good"+score card & trend
  d. Yellow, half screen
    i. "IMPACTS Improving"+score card & trend Stops Stop warning messages displayed on an industrial vehicle display may include:

Inculcating/Caution Message (Predictive)
   e. Yellow, whole screen
      i. "STOP Stop at Intersection"+score card & trend
Warning Message (Reactive)
   f. Red, whole screen
      i. "STOP Failed to Stop" +score card & trend
Positive Reinforcement Messages
   g. Green, whole screen
      i. "STOPS Good"+score card & trend
   h. Yellow, half screen
      i. "STOPS Improving"+score card & trend Proximity Proximity based warning messages displayed on an industrial vehicle display may include:

Caution Message
   i. Yellow, whole screen
      i. "PROXIMITY 3 mph"+score card & trend
Warning Message
   j. Red, whole screen
      i. "PROXIMITY Over 3 mph"+score card & trend
Positive Reinforcement Messages
   k. Green, whole screen
      i. "PROXIMITY Speed Good"+score card & trend
   l. Yellow, half screen
      i. "PROXIMITY Improving"+score card & trend Examples of performance messages on a pallet industrial vehicle for the vehicle operator.

Target (Cases or pallets moved)

Productivity warning messages displayed on an industrial vehicle display may include:

Caution Message
   m. Yellow, whole screen
      i. "CASES PICKS"+score card & trend
      ii. Score 104 with a big down arrow
Warning Message
   n. Red, whole screen
      i. "CASES PICKS"+score card & trend
      ii. Score 88 with a big down arrow
Positive Reinforcement Messages
   o. Green, whole screen
      i. "CASES PICKS"+score card & trend
      ii. Score 108 with a big arrow pointing left (stable)
   p. Yellow, half screen
      i. "CASES PICKS Improving"+score card & trend
      ii. Score 96 with a big up arrow The mode rule(s) at 506 identify parameters, rules, etc., that determine the condition upon which a mode (e.g., inculcate, normal, warning) is associated with a vehicle operator for the corresponding metric. For instance, a mode rule may establish a number of consecutive behaviors to move from one mode to another. As an example, an inculcate mode may be set for an event if the vehicle operator has demonstrated less than X consecutive proper behaviors in response to the event. Likewise, an experienced operator (e.g., normal mode for the metric) can be demoted back to an inculcated status if the experienced operator fails to perform the intended behavior Y consecutive times, Z times within a predetermined period, etc. Other measures can also or alternatively be used to determine when to transition between modes. Moreover, different events can have different rules. For instance, more difficult or more critical events (e.g., high reach put away operations, driving on the loading dock, etc.) may require greater repetitions of proper behavior to earn an experienced status.

The pre-action trigger at 508 is one or more actions, events, parameters, rules, etc., that characterize when the method predicts that the event is about to occur, if predictive capability is enabled for the metric. In order to provide on-demand in-time coaching, certain events may require predictive capability. The pre-action trigger defines those predictive parameters. For instance, in the above example, the pre-action trigger for an event to sound a horn at the end of an aisle is the detection of the industrial vehicle near the end of an aisle. As another example, an event such as driving into a loading zone may require the vehicle operator to slow down and/or moderate speed to a predefined speed limit. As such, the vehicle must know when it is about to enter the loading zone. This pre-action may even be dynamic. For instance, a suitable slow-down may be dependent upon the weight of the load carried by the vehicle. As such, the method may consider load, vehicle speed, and number of other vehicles/workers in the area, etc. as dynamic inputs that affect the pre-action trigger.

The evaluation rule at 510 is one or more rules that characterize whether the vehicle operator complied with the behavior associated with a corresponding event. For instance, the evaluation rules 510 may be defined by one or more performance parameters. As noted herein, a performance parameter defines the desired, intended, appropriate or otherwise required vehicle operator behavior (e.g., what the vehicle operator should and/or should not do) in response to an occurrence of the event associated with the metric. Thus, for instance, if the event is a slow down in a loading zone, then the evaluation rule determines whether the operator actually slowed down. The exact implementation of the rule will thus depend upon the corresponding event and the capability of the processing device on the industrial vehicle to extract relevant information (event data).

According to further aspects of the present disclosure, the evaluation rules can include compliance rules that identify compliance with a corresponding behavior, consequence rules that identify when corrective action is taken (and optionally, the severity of the corrective action), post-violation rules that determine a response after a desired behavior in response to an event has been determined to be improper, etc.

The benchmark at 512 is a measure that is used as a comparative to evaluate a vehicle operator, a group of vehicle operators (e.g., a team of vehicle operators), etc. The particular benchmark will depend upon the nature of the event associated with the metric.

The weight at 514 represents an optional scaling that allows a supervisor to put a higher emphasis or importance on one metric over another. This allows customization of metrics and of score computations to suit the needs or expectations of a particular implementation.

Thus, for instance, each metric can be weighted as selected by the customer. The system keeps a record of individual, group, etc., safety and performance indicia via the operator usage and performance data, which provides the operator feedback (e.g., a performance score). Moreover, the score could be used as part of performance evaluation or an incentive program (e.g., monetary or other award/rewards).

Note that while the basic function of several metrics can be enabled without location tracking, many useful metrics are greatly enhanced by location tracking technology. In this regard, localization necessary for location tracking can be accomplished through mapping of vehicle position, through the detection of tags, such as RFID tags, or other suitable technologies (e.g., cameras/image identification, etc.). As a few illustrative examples:

Ex. The system predicts and then tells the operator that the truck is approaching a "STOP" intersection.

Ex. The system provides an instant replay map or heat map of an impact event or any other event associated with a metric.

Ex. The system tells the operator they are approaching a ramp incorrectly before they get to the ramp.

Optionally, each metric can have one or more gamification rewards at 516. Gamification rewards may include scores, badges, achievement recognitions, etc., as described herein.

Vehicle Operator Gamification:

Gamers may like the ability to score/compete against others or just know how they compare. As such, techniques such as those employed in gamification systems can also be implemented. For instance, proper behaviors earn a higher score, which can serve as a badge that is earned. In this regard, gamification techniques are utilized within the dynamic operator behavior analyzer to facilitate competition among vehicle operators for achievement, status, self-expression, etc. Gamification is implemented by providing a set of rewards to vehicle operators, through the use of points, virtual coins/currency, virtual badges, a progress bar/meter, etc. Rewards can be accumulated based upon the operator score disclosed more fully herein. For instance, rewards can be provided for exhibiting proper behavior. Badges can be displayed on the vehicle display to recognize the achievements of the vehicle operator.

Badges can also be used in an inverse manner as well. For instance, a "rookie" badge may be constantly visible on a public display of a vehicle operator until such time as the vehicle operator earns the right to have the badge removed. Rewards can also be earned by actions of a vehicle operator including X number of working days without an incident, attendance, years of service, number/type of vehicle operating endorsements, skill level achieved on one or more vehicle types, etc.

In this regard, competition is fostered by making vehicle operator rewards visible to other vehicle operators (e.g., through a "leaders' board" that can be displayed on a display screen, through comparison metrics on a dashboard, or through other visual displays).

Miscellaneous

For the manager, the industrial vehicle system measures and manages new safety and performance metrics relative to a benchmark or target. Managers are shown actual performance verses the benchmark (e.g., 22 impacts this week; goal is <18 impacts per week). Managers are also shown a normalized score for each metric as a percentage (e.g., Impacts 94%), to make relative comparisons between each metric. Dashboards, map views and data visualizations allow the manager to see what matters and take action.

For the operator, each metric has a series of instruction and behavior modification actions that are presented to the operator in real-time on the industrial vehicle display at the ideal moment (e.g., operator receives a "STOP" message just prior to arriving at the intersection). The messages are repeated until the operator consistently demonstrates the correct behavior. When the operator is consistent the messages disappear. If the operator makes a mistake, then the messages reappear until they become consistent again.

Aspects of the present disclosure may utilize external information to the industrial vehicle, and information that can be wholly derived from information ascertainable by the industrial vehicle (e.g., via sensors, CAN bus monitoring, etc.). For instance, location tracking can provide information on geofenced locations, stop signs, slow or congested areas, etc. Location tracking can also tell where in the warehouse that the user is working. Thus, location tracking may approximate close calls based upon other location tracking assets. Here, the system may actually know that an operator is in breach before the operator knows. Moreover, ultrasonic sensors, cameras and other machine enabled technologies can provide feedback that is unavailable to the location tracking system.

Localized relative position feedback also provides an opportunity to cure before the server is informed that a condition exists. For instance, ultrasonic sensors mounted on the industrial vehicle can allow an operator to correct a behavior before the system reports it to the server. Also, such localized knowledge is not dependent upon receipt of information over the wireless network.

According to aspects of the present disclosure, new metrics for performance are provided through a series of communications between a vehicle operator and the corresponding vehicle. The vehicle will communicate to its operator in real-time through timely messages on a truck display or other form of communication. Thus, the industrial vehicle is giving the operator coaching and instructional information at the ideal moment to help the operator improve and maintain their skills.

For instance, each time a positive reinforcement, warning, or coaching/inculcating message is provided, the operator's score (e.g., normalized to 100%) can be displayed so that the operator has a running indication of performance. Also, statistics can be provided (e.g., average, mean, high score, low score, etc.). These statistics can pit the operator against their own previous scores, or the statistics can represent a comparison against a group of operators.

From the perspective of the supervisor, the dashboard provides a score (e.g., a grade point average (GPA) or other way to evaluate, compare and rank vehicle operators based upon their behavior) so that the supervisor does not have to pour through data unless they want to drill down to particular behavior. High scorers can be recognized/rewarded; low scorers can be coached, held accountable, re-assigned, etc.

Accordingly, aspects of the present invention empower the operator to improve by giving them the tools to track their habits, provide real-time feedback, and give them incentive to improve (socially, monetarily, etc).

Computer System Overview

Figure 6:
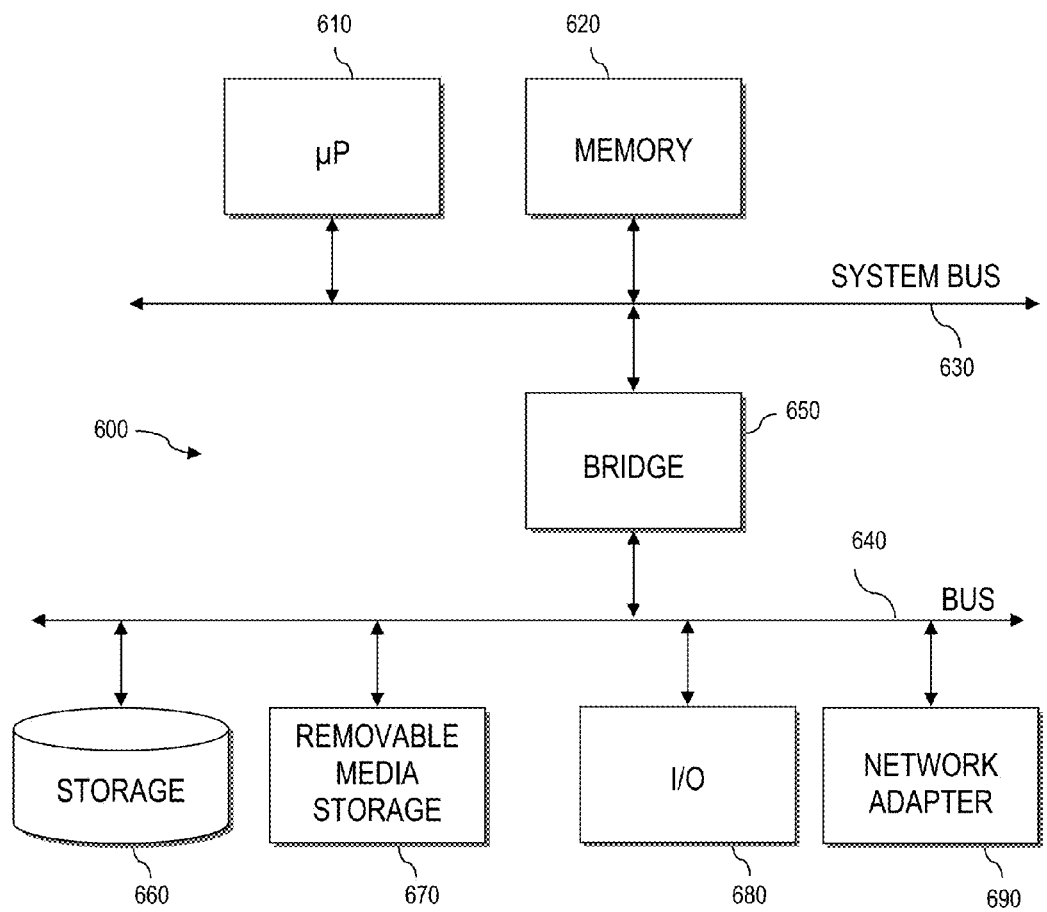
FIG. 6 is a block diagram of a computer processing system capable of implementing any of the systems or methods described more fully herein, including the dynamic operator behavior analyzer and the method for providing dynamic monitoring and modification of vehicle operator behavior, according to aspects of the present disclosure herein.

Referring to FIG. 6, a schematic block diagram illustrates an exemplary computer system 600 for implementing the various methods described herein, e.g., by interacting with a user. The exemplary computer system 600 includes one or more microprocessors (µP) 610 and corresponding memory 620 (e.g., random access memory and/or read only memory) that are connected to a system bus 630. Information can be passed between the system bus 630 and bus 640 by a suitable bridge 650. The bus 640 is used to interface peripherals with the one or more microprocessors (µP) 610, such as storage 660 (e.g., hard disk drives); removable media storage devices 670 (e.g., flash drives, DVD-ROM drives, CD-ROM drives, floppy drives, etc.); I/O devices 680 (e.g., mouse, keyboard, monitor, printer, scanner, etc.); and a network adapter 690. The above list of peripherals is presented by way of illustration, and is not intended to be limiting. Other peripheral devices may be suitably integrated into the computer system 600. The memory 620, storage 660, removable media insertable into the removable media storage 670 or combinations thereof, can be used to implement the methods, configurations, interfaces and other aspects set out and described herein with regard to FIG. 1-FIG. 5.

The microprocessor(s) 610 control operation of the exemplary computer system 600. Moreover, one or more of the microprocessor(s) 610 execute computer readable code that instructs the microprocessor(s) 610 to implement the methods herein. The computer readable code may be stored for instance, in the memory 620, storage 660, removable media storage device 670 or other suitable tangible storage medium accessible by the microprocessor(s) 610. The memory 620 can also function as a working memory, e.g., to store data, an operating system, etc.

Thus, the exemplary computer system 600 or components thereof can implement methods and computer-readable storage devices as set out in greater detail herein. Other computer configurations may also implement the methods and computer-readable storage devices as set out in greater detail herein. Computer program code for carrying out operations for aspects of the present invention may be written in any combination of one or more programming languages. The program code may execute entirely on the computer system 600, partly on the computer system 600, partly on the computer system 600 and partly on a remote computer or entirely on a remote computer or server. In the latter scenario, the remote computer may be connected to the computer system 600 through any type of network connection, e.g., using the network adapter 690 of the computer system 600.

Aspects of the present invention are described herein with reference to flowchart illustrations of methods and computer program products according to embodiments of the invention. Each block of the flowchart illustrations can be implemented by computer program instructions. These computer program instructions may be provided to a processor to produce a machine, such that the instructions, which execute via the processor of the computer or other programmable data processing apparatus, create means for implementing the functions/acts specified in the flowchart.

These computer program instructions may also be stored in a computer readable storage medium (i.e., computer readable storage device) such that the instructions stored in the computer readable medium produce an article of manufacture including instructions, which implement the function/act specified in the flowcharts when implemented by a processor.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation. Any combination of one or more computer readable media may be utilized. Aspects herein may be implemented either as a computer readable storage medium or a computer readable signal medium. A storage medium is a tangible or otherwise physical memory, e.g., a storage device. A computer readable signal medium may include a propagated data signal per se, with computer readable program code embodied therein, for example, in baseband or as part of a carrier wave. A computer readable signal medium may be any computer readable medium that is not a computer readable storage medium and that can communicate, propagate, or transport a program for use by or in connection with an instruction execution system, apparatus, or device.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of providing dynamic industrial vehicle monitoring for modification of vehicle operator behavior, the method comprising:
    identifying a metric that characterizes an event associated with the operation of an industrial vehicle, the metric having a performance parameter to evaluate against the event and a behavior modification action;
    monitoring operation of the industrial vehicle for the event, comprising:
        predicting that the event will occur before the event actually occurs; and
        performing, based upon predicting that the event will occur:
            determining whether the operator has been inculcated to respond to the event; and
            performing the behavior modification action before the event actually occurs based upon the determination that the operator has not been inculcated to respond to the event;
    detecting an occurrence of the event, and performing:
        recording event data that characterizes a response of a vehicle operator to the event;
        evaluating the recorded event data against the performance parameter associated with the metric that characterizes the event to determine whether the vehicle operator demonstrated appropriate behavior for the event;
        updating a vehicle operator score based upon the evaluation; and
        communicating the updated vehicle operator score.

2. The method of claim 1, wherein:
    identifying a metric further comprises:
        identifying a behavior modification action; and
    monitoring for the event comprises:
        predicting that the event will occur before the event actually occurs; and
        performing the behavior modification action before the event actually occurs.

3. The method of claim 2, wherein the behavior modification action comprises an instruction on the behavior necessary to comply with the event predicted to occur.

4. The method of claim 2, wherein:
identifying a metric further comprises:
    identifying a pre-action trigger that defines how to predict that the event will occur;
wherein:
    predicting that the event will occur before the event actually occurs comprises comparing information obtained by the industrial vehicle against the pre-action trigger to predict whether the event is about to occur.

5. The method of claim 4, wherein:
comparing information obtained by the industrial vehicle against at least one pre-action trigger comprises:
    comparing location tracking information collected from a location tracking device on the industrial vehicle against at least one pre-action trigger.

6. The method of claim 1, wherein:
identifying a metric further comprises:
    identifying a behavior modification action;
and the method further comprises:
    performing the behavior modification action upon determining that the vehicle operator did not demonstrate appropriate behavior for the event.

7. The method of claim 6, wherein the behavior modification action comprises providing a message that indicates a behavior that was expected in response to the occurrence of the event.

8. The method of claim 6, wherein the behavior modification action comprises a coaching instruction that explains how to correct an operator performance in response to the event to achieve a desired behavior for that event.

9. The method of claim 1, wherein:
identifying a metric further comprises:
    identifying a behavior modification action;
and the method further comprises:
    determining whether the operator has been inculcated to respond to the event; and
    performing the behavior modification action upon determining that the vehicle operator did not demonstrate appropriate behavior for the event, based upon the determination that the operator has not been inculcated to respond to the event.

10. The method of claim 9, wherein:
identifying a metric further comprises:
    identifying at least one inculcating rule that determines whether a mode associated with the vehicle operator is in an inculcating mode or a normal mode for the event;
wherein:
    the behavior modification action is implemented for the vehicle operator when in the inculcating mode, and wherein the behavior modification action is not implemented when the vehicle operator is in the normal mode for that event.

11. The method of claim 1 further comprising:
assigning a set of virtual rewards including virtual badges to vehicle operators based upon achievements as determined from the vehicle operator score.

12. The method of claim 1 further comprising:
identifying a plurality of additional metrics that each characterize an action that is implemented on the industrial vehicle, wherein the metric and the plurality of additional metrics collectively define a set of metrics; and
selecting at least one of a priority and a weighting of the set of metrics.

13. The method of claim 12, wherein identifying a metric and identifying a plurality of additional metrics, comprise:
    selecting from a list of available metrics that have been pre-defined.

14. The method of claim 1 further comprising:
comparing the vehicle operator score against a benchmark to determine a benchmarked score; and
presenting the determined benchmarked score to the operator by displaying the determined benchmarked score on a display of the industrial vehicle.

15. The method of claim 1 further comprising:
assigning for the metric:
    inculcating conditions that define a parameter for determining whether the vehicle operator has been inculcated to perform an action associated with the event.

16. The method of claim 1 further comprising:
obtaining an operator identification that identifies the vehicle operator that has logged onto the industrial vehicle.

* * * * *